US010171323B2

(12) United States Patent
Magielse, Sr. et al.

(10) Patent No.: US 10,171,323 B2
(45) Date of Patent: Jan. 1, 2019

(54) DETERMINING A STATE OF A NETWORK DEVICE

(71) Applicant: PHILIPS LIGHTING HOLDING B.V., Eindhoven (NL)

(72) Inventors: Remco Magielse, Sr., Tilburg (NL); Hugo Jose Krajnc, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/750,252

(22) PCT Filed: Jul. 18, 2016

(86) PCT No.: PCT/EP2016/067054
§ 371 (c)(1),
(2) Date: Feb. 5, 2018

(87) PCT Pub. No.: WO2017/025278
PCT Pub. Date: Feb. 16, 2017

(65) Prior Publication Data
US 2018/0227204 A1      Aug. 9, 2018

(30) Foreign Application Priority Data
Aug. 7, 2015   (EP) .................................... 15180200

(51) Int. Cl.
| G08B 21/00 | (2006.01) |
| H04L 12/26 | (2006.01) |
| H04W 24/08 | (2009.01) |
| H05B 37/02 | (2006.01) |
| H05B 37/03 | (2006.01) |

(52) U.S. Cl.
CPC ......... *H04L 43/0817* (2013.01); *H04W 24/08* (2013.01); *H05B 37/0272* (2013.01); *H05B 37/03* (2013.01)

(58) Field of Classification Search
CPC ........................ H05B 33/0848; H05B 37/0227
USPC ............... 340/635, 641, 642; 356/226, 306; 702/182
See application file for complete search history.

(56) References Cited

U.S. PATENT DOCUMENTS

| 2006/0084479 A1 | 4/2006 | Kim et al. |
| 2013/0080633 A1 | 3/2013 | Johnsson et al. |
| 2013/0342131 A1* | 12/2013 | Recker ............... H05B 33/0842 315/292 |

(Continued)

FOREIGN PATENT DOCUMENTS

| WO | 2008084414 A1 | 7/2008 |
| WO | 2010097742 A1 | 9/2010 |
| WO | 2014090969 A2 | 6/2014 |

*Primary Examiner* — Toan N Pham

(57) ABSTRACT

The invention provides a processor and a method for determining the state of a first network device in a lighting network based upon information associated with the first network device and a second network device adapted to pass messages to the first network device. The first network device is associated with a first count value, and the second network device is associated with a second count value. When the first count value is within a predetermined range relative to the second count value, the first network device is determined to have been inactive. Each respective count value is based on the change or difference in an incremental property of the respective network device since a last reset of the count value.

15 Claims, 8 Drawing Sheets

(56) References Cited

U.S. PATENT DOCUMENTS

| | | |
|---|---|---|
| 2014/0133845 A1 | 5/2014 | Dahlfort et al. |
| 2014/0201353 A1 | 7/2014 | Poe |
| 2015/0048758 A1* | 2/2015 | Carrigan ............ H05B 33/0842 |
| | | 315/294 |
| 2015/0100166 A1 | 4/2015 | Baynes et al. |
| 2015/0130359 A1 | 5/2015 | Bosua et al. |
| 2016/0286627 A1* | 9/2016 | Chen .................. H05B 37/0245 |
| 2018/0146526 A1* | 5/2018 | Creusen ............. H05B 37/0227 |

* cited by examiner

DETERMINING A STATE OF A NETWORK DEVICE

CROSS-REFERENCE TO PRIOR APPLICATIONS

This application is the U.S. National Phase application under 35 U.S.C. § 371 of International Application No. PCT/EP2016/067054, filed on Jul. 18, 2016 which claims the benefit of European Patent Application No. 15180200.6, filed on Aug. 7, 2015. These applications are hereby incorporated by reference herein.

FIELD OF THE INVENTION

This invention relates to the field of lighting networks, and in particular to the field of determining the state of a device in the lighting network.

BACKGROUND OF THE INVENTION

There has been an increasing trend in the use of portable consumer devices capable of communicating with other devices so as to form a network of devices. Such communication is typically performed using known wireless protocols (e.g. WiFi, Bluetooth, and ZigBee). A similar trend can be observed with lighting devices, such as LEDs and lighting displays, which are increasingly becoming connectable to such networks. These devices are typically able to create their own network and/or connect to an existing network so as to form a lighting network.

It will be apparent that reliability of such a lighting network is increasingly important. If, for example, a message for a particular device in the network is not correctly received by the device, this may lead to confusion for a user of the device and erroneous behaviour of the network.

WO 2008/084414 describes a network communication system in which a network device communicates with a co-ordinator. In an embodiment, the system is adapted to increase a counter to indicate a number of times the network device has not responded. The counter value may be compared to a 'predefined threshold' to determine a status of the network device.

US 2006/084479 describes a method for displaying information items related to a network. The method comprises outputting one of information relating to the activation status of the network and information relating to the amount of data being transmitted and received.

SUMMARY OF THE INVENTION

The invention is defined by the claims.

According to a first aspect of the inventive concept, there is provided a processor for determining a state of a first network device in a lighting network, the processor being adapted to: ascertain a first count value associated with the first network device and a second count value associated with a second network device adapted to pass messages to the first network device; determine a state of the first network device based on the first count value and the second count value, wherein if the first count value is within a first predetermined range relative to the second count value, the processor determines that the first network device has been inactive, wherein the first count value is dependent on the change of an incremental property of the first network device since a last reset of the first count value and the second count value is dependent on the change of an incremental property of the second network device since a last reset of the second count value.

In other words, there is provided a processor which is adapted to determine the present state or available functionality of a first network device in a lighting network. The processor is adapted to receive or otherwise determine a first count value and a second count value, the first count value being associated with the first network device, and the second count value being associated with a second network device adapted to pass messages to the first network device.

A predetermined range is calculable with reference to the second count value. The processor is adapted to determine the state of the first network device by comparing the first count value to this predetermined range. When the count value is within the predetermined range, the first network device is determined to have been inactive.

The count value indicates the change of a property of a network device since a last reset of the count value, wherein the property may be incremented in response to a certain action or process (e.g. a counter). For example, the incremental property of the first and second network device may be an amount of time elapsed, such that the count value is representative of the time elapsed since the count value was last reset. In other embodiments, the incremental property of the first network device is a number of messages received, such that the first count value is representative of the number of messages received by the first network device since the count value was reset.

For the avoidance of doubt, it will be apparent that the count value represents a count or measure of an incremental property (e.g. time, messages sent, number of failed messages and so on) associated with a particular network device. By way of example, the first count value represents a count of an incremental property of the first network device (e.g. number of messages sent by first network device, number of messages not received by first network device etc.). The second count value represents a count of an incremental property of the second network device (e.g. number of messages sent by second network device, number of acknowledgment messages received by the second network device etc.). The determination of a state of the first network device is therefore dependent upon a count value (i.e. measure of an incremental property) of at least two network devices.

Embodiments of the invention allow the cause of failure of a device in a network to be reliably determined. This permits information relating to this cause of failure to be provided (e.g. displayed) to a user who may be able to control the first network device so as to rectify the failure of the first network device in response to this information.

Furthermore, the invention allows for further algorithms within the network to account for an unreachable (e.g. inactive) network device. This may result in a reduction in network traffic, thereby leading to possible reductions in latency, congestion and noise of the network. Furthermore, there is the potential for the overall network to have a reduced power consumption, as the network may, for example, not attempt to contact an unreachable network device or only attempt contact as less frequent periods.

In particular embodiments, the first count value is representative of a number of messages or amount of data received by the first network device from the second network device since a last reset of the first count value; and the second count value is representative of a number of messages or amount of data transmitted by the second network device for the first network device since a last reset of the second count value.

In other words, a count value may be a measure of the number of messages transmitted to/received by the first network device. The predetermined range may therefore be, for example, a percentage of the number of messages that were transmitted to the first network device by the second network device.

The first count value may be otherwise named a message count value, the message count value being an indication of the number of messages or amount of data received by the first network device. The first network device may, for example, count the number of messages received within a predetermined time period in order to generate the message count value.

In some embodiments, information of the state of the first network device is presented to the user to inform them about the current status of the network and about possible ways to resolve any issues. In some advantageous embodiments, different actions for devices in the network can be automatically triggered based on the status of the first network device.

The processor may be positioned in the first network device itself, or in a device separate from the first network device. Positioning the processor in the first network device allows an indication to be dynamically provided to the user, for example, upon movement of the device, so as to provide an immediate notification to the user. Positioning the processor in a separate device to the first network device allows for a central device, for example a network bridge, to coordinate other devices in the network to account for the state of the first network device.

Optionally, if the first count value (e.g. the message count value) is within a second predetermined range relative to the second count value, the first network device is determined to be unreachable because it is out of range of the network; and if the first count value is within a third predetermined range, the first network device is determined to be reachable.

This advantageously provides a method of explicitly distinguishing between a device that is disabled or inactive (e.g. switched off) and devices that are simply out of range of the network. This may advantageously allow a user to acquire further information about the device.

The first count value may be a measure of at least one of the following: the number of messages or amount of data received or transmitted by the first network device since a last reset of the first network device; the number of messages or amount of data received or transmitted by the first network device since a last reset of the first network device; and the number of messages or amount of data received or transmitted by the first network device in a predetermined time period.

In at least one embodiment, the first count value is representative of a time elapsed since a last reset of the first count value; and the second count value is representative of a time elapsed since a last reset of the second count value.

In other words, the processor may be adapted to determine the state of the device based on a time since reset of the first count value and a time since reset of the second count value. For example, if the time since reset of the first count value is less than the time since reset of the second count value, it is determinable that the first network device has been at least temporarily inactive.

In some embodiments, the processor is further adapted to ascertain a difference value based on a first calculated difference between the second count value measured in response to the second network device transmitting a first message to the first network device and the first count value measured in response to the first network device receiving the first message; and determine the state of the first network device based on the difference value.

Identifying a state of a device based on the difference value allows detection of whether the device has been reset or powered on and off again to be reliably identified. It also allows for the state of the first device concerning a specific communication with a further network device (i.e. the second network device) to be determined.

The processor may be further adapted to ascertain a second calculated difference between the second count value measured in response to the second network device transmitting a second, later message to the first network device and the first count value measured in response to the first network device receiving the second message, wherein the difference value is a difference between the second calculated difference and the first calculated difference.

Determining the state of the device based on the difference value when associated with two separate messages in this manner provides the additional advantage that a reset of the first network device in between messages may be readily recognised, such that a more accurate and precise time of a reset the first network device can be determined.

Preferably, the processor is adapted wherein: if the difference value is greater than a first predetermined value, the first network device is determined to be a cause of network performance degradation; if the difference value is less than a second predetermined value, the first network device is determined to be at least partially unable to communicate with the second network device; and if the difference value is less than or equal to the first predetermined value and greater than or equal to the second predetermined value, the first network device is determined to be operating correctly.

Both, the first and the second predetermined value may, in some simple embodiments, be zero. In other embodiments, the first predetermined value is a number greater than zero (e.g. 5, 10 or 20) and the second predetermined value is a number less than zero (e.g. −5, −10 or −20). Preferably the modulus of the first predetermined value and the modulus of the second predetermined value is the same.

In at least one embodiment, the processor is adapted to ascertain both the message count value and the difference value so as to determine the state of the first network device.

According to a second aspect of the inventive concept, there is provided a first network device adapted to determine its own state, the first network device comprising a processor as previously described.

According to a third aspect of the inventive concept, there is provided a network bridge comprising a processor as previously described, wherein the network bridge: plays the role of the second network device adapted to pass messages to the first network device; and is adapted to receive the at least the first count value from the first network device.

Provision of a network bridge having a processor as described above advantageously provides a central location where determining and/or analysis of the state of the first network device may be performed, so as to allow the network to account for this state.

The network bridge may be further adapted to pass a first reset signal to the first network device so as to reset the first count value.

Optionally, the network bridge may be adapted to control the actions of the first network device, for example, in response to a determined state of the first network device.

Optionally, the network bridge is adapted to generate information related to the state of the first network device for provision to a visual display device, the visual display device being adapted to display a visual representation of the state of the first network device.

According to a fourth aspect of the inventive concept, there is provided a computer implemented method of determining a state of a first network device in a lighting network, the computer-implemented method comprising: ascertaining a first count value associated with the first network device and a second count value associated with a second network device adapted to pass messages to the first network device; determining a state of the first network device based on the first count value and the second count value, wherein if the first count value is within a first predetermined range relative to the second count value, the processor determines that the first network device has been inactive, wherein the first count value is dependent on the change of an incremental property of the first network device since a last reset of the first count value and the second count value is dependent on the change of an incremental property of the second network device since a last reset of the second count value.

In some embodiments: the first count value is representative of a number of messages or amount of data received by the first network device from the second network device since a last reset of the first count value; the second count value is representative of a number of messages or amount of data transmitted by the second network device for the first network device since a last reset of the second count value; if the first count value is within a second predetermined range relative to the second count value, the first network device is determined to be unreachable because it is out of range of the network; and if the first count value is within a third predetermined range, the first network device is determined to be reachable.

In other embodiments: the first count value is representative of a time elapsed since a last reset of the first count value; and the second count value is representative of a time elapsed since a last reset of the second count value.

In further embodiments, the computer-implemented method further comprises: ascertaining a first calculated difference between the second count value measured in response to the second network device transmitting a first message to the first network device and the first count value measured in response to the first network device receiving the first message; ascertaining a second calculated difference between the second count value measured in response to the second network device transmitting a second, later message to the first network device and the first count value measured in response to the first network device receiving the second message; calculating a difference value, the difference value being a difference between the second calculated difference and the first calculated difference; and determining the state of the first network device based on the difference value.

In some embodiments: if the difference value is greater than a first predetermined value, the first network device is determined to be a cause of network performance degradation; if the difference value is less than a second predetermined value, the first network device is determined to be at least partially unable to communicate with the second network device; and if the difference value is less than or equal to the first predetermined value and greater than or equal to the second predetermined value, the first network device is determined to be operating correctly.

According to a fifth aspect of the inventive concept there is provided a computer program product comprising computer program code adapted to perform the steps of any computer-implemented method previously described when said computer program code is performed by a processor.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a processor and a method for determining the state of a first network device in a lighting network based upon information associated with the first network device and a second network device adapted to pass messages to the first network device. The first network device is associated with a first count value, and the second network device is associated with a second count value. When the first count value is within a predetermined range relative to the second count value, the first network device is determined to have been inactive. Each respective count value is based on the change or difference in an incremental property of the respective network device since a last reset of the count value.

Figure 1A:
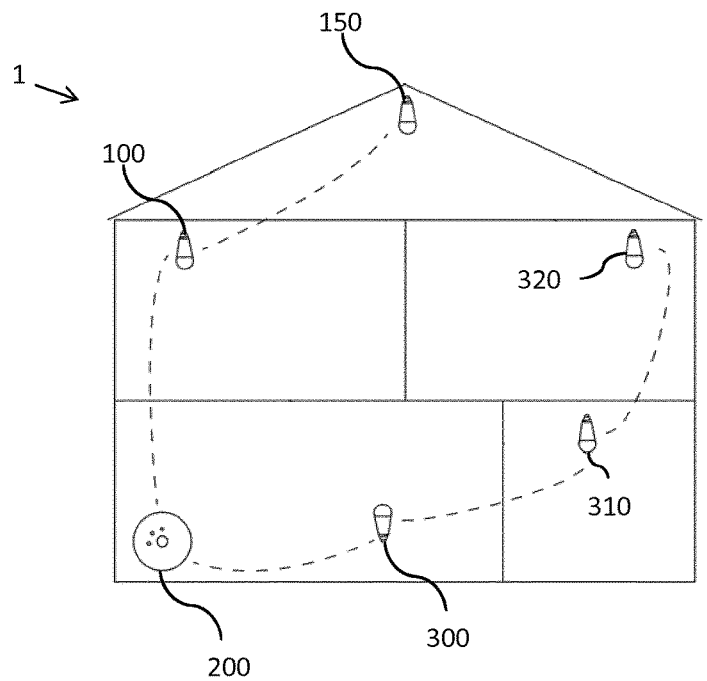
FIG. 1A illustrates a simple network comprising a network bridge having a processor according to a first embodiment of the invention.

With reference to FIG. 1A, the basic concept of a simple network of devices, of which at least one comprises a processor according to an embodiment of the invention, will be understood.

The network 1 identified in FIG. 1A comprises a plurality of network devices. There is specifically identified a first network device 100 and a second network device 150 adapted to communicate with one another. There is also shown a first additional network device 300, a second additional network device 310 and a third additional network device 320.

A network bridge 200 of the network is adapted to communicate with the first network device 100. The network bridge acts as a central hub or server adapted to control the characteristics of the network 1, for example, a carrier frequency or time slot of a communication medium over which the network devices may communicate. The network bridge is also adapted to control the actions performed by the network devices. In order to control these actions, the network bridge 200 is adapted to generate messages for provision to the network devices of the network 1.

The first network device is adapted to act as a router, so as to route or pass messages to be passed to and from the second network device 150 (e.g. from and to the network bridge 200 respectively).

Similarly, the first additional network device is adapted to pass messages to and from the second network device (e.g. from and to the network bridge). Furthermore the second additional network device is adapted to pass messages to and from the first additional network device (e.g. from the third additional network device) and the third additional network device (e.g. from the first additional network device). In this way, messages may be passed to and/or from each network device in the network.

The network devices (e.g. first network device 100 and second network device 150) and the network bridge 200 are adapted to communicate with one another via a wireless communication protocol. In other words, the network is typically a wireless network. Suitable wireless communication protocols that the said network device may to communicate include an infrared link, Zigbee, Bluetooth, a wireless local area network protocol such as in accordance with the IEEE 802.11 standards, a 2G, 3G or 4G telecommunication protocol, and so on. Other formats, technologies or protocols will be readily apparent to the person skilled in the art.

It will be apparent that at least two of the network devices may be connected via a direct wired connection over which the at least two network device may communicate. For example, the first additional network device and the second additional network device may be connected via a wire, so as to allow communication with one another.

Figure 1B:
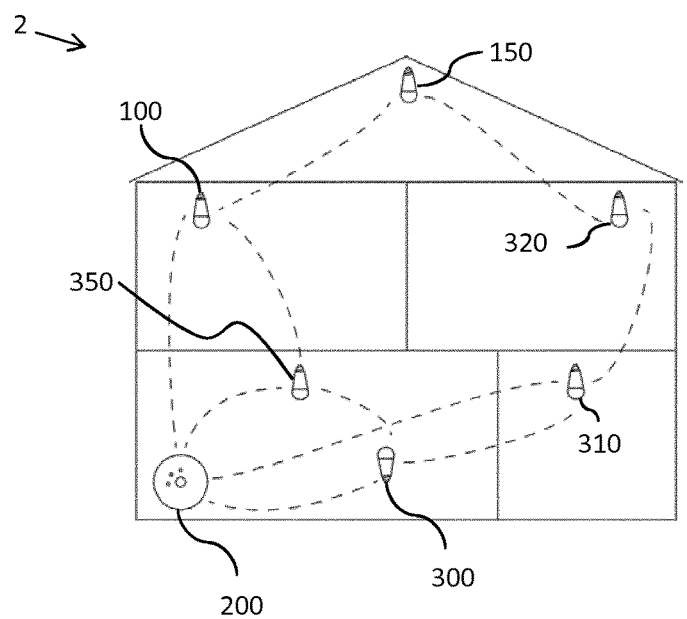
FIG. 1B illustrates a more complex network comprising a network bridge having a processor according to the first embodiment of the invention.

A more complex network 2 of devices is shown in FIG. 1B, which identifies further possible inter-device communication connections in the network.

For example, the second network device 150 may be adapted to communicate with the third additional network device 320. This advantageously allows for there to be more than one communication path between an arbitrary pair of network devices in the network 2. This advantageously allows the network 2 to have a degree of redundancy, such that, for example, if a single node becomes inactive, the remaining nodes may still communicate with one another.

Furthermore, the more complex network 2 comprises a further network device 350 which may communicate with more than two network devices (e.g. first network device 100, first additional network device 300 and the network bridge 200). This allows an even greater number of possible communication paths, thereby increasing the degree of redundancy in the network.

Figure 2:
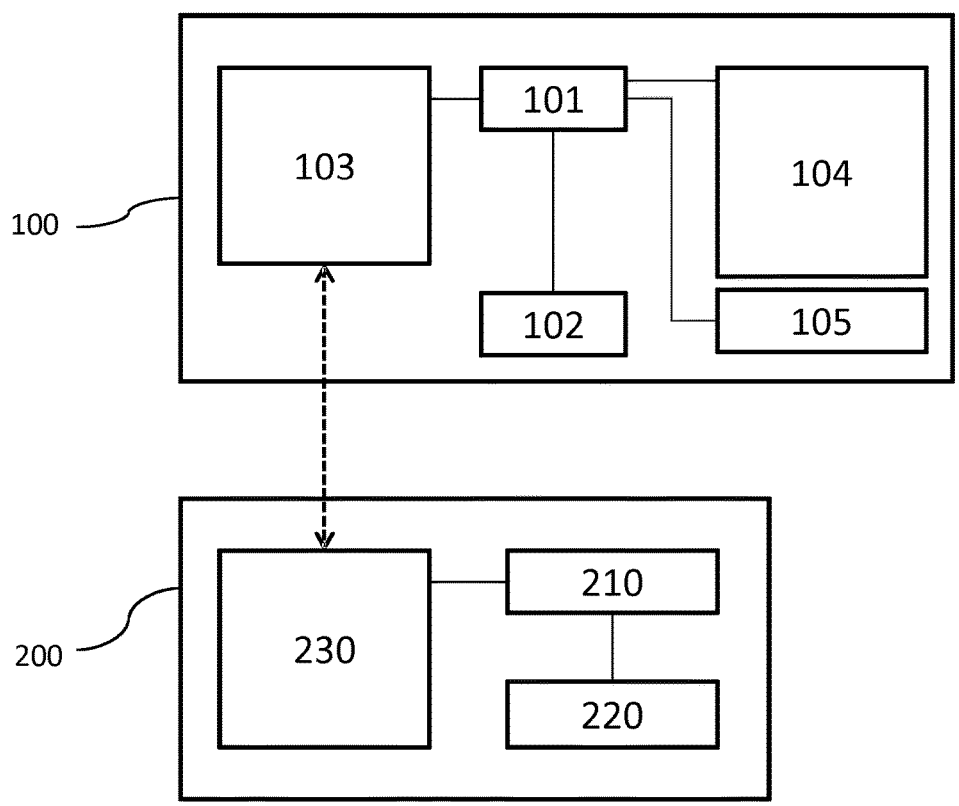
FIG. 2 illustrates a first network device and a network bridge having a processor according to the first embodiment of the invention.

The structure of the network bridge 200 and the first network device 100 having a processor according to a first embodiment of the invention will be understood with reference to FIG. 2.

The first network device 100 is embodied as a wirelessly connectible lamp, having a light emitting element 104, a device processor 101, a device memory 102, a device input module 105 and a device transceiver 103.

The network bridge 200 comprises a processor 210 according to a first embodiment of the invention, a bridge memory 220 and a bridge transceiver 230.

The processor 210 is adapted to generate messages (i.e. data) for provision to the first network device. The messages may be passed to the first network device 100 via the bridge transceiver 230 and the device transceiver 103. In other words, the network bridge 200 is adapted to broadcast and receive messages to/from the first network device.

Received messages may be interpreted by the device processor 101 so as to perform particular actions of the first network device. For example, a particular action may be an operation of one of the following: controlling a function of the light emitting element 104 and adjusting a property of the channel over which the device transceiver communicates. In other embodiments, the particular action may be transmission of information concerning the first network device (e.g. identifying data) to another device (e.g. the network bridge) or enabling or disabling certain features of the device processor (for example, certain firmware).

Embodiments of the light emitting element 104 may be readily realised by a person skilled in the art. For example, the light emitting element may comprise one or more light emitting diodes (LEDs), a visual output device (e.g. an LCD display), a halogen bulb and so on. The light emitting element may be adapted to be easily replaceable or removable from the first network device.

The device processor 102 is adapted to generate a first count value dependent upon a change of an incremental property of the first network device 100.

The first count value is capable of being reset, such that the first count value is dependent upon a change in the incremental property of the first network device since a last reset of the first count value.

The incremental property is a property of the device that can cause an incremental change in the first count value. For example, the incremental property may be an elapsed time, such that a change in time (i.e. the passage of time) causes the first count value to be incremented. In other embodiments, the incremental property of the first network device is a measure of the number of messages or amount of data received by the first network device (e.g. from the network bridge or another network device), such that receiving a message increments the first count value.

Other possible incremental properties will be recognised by a person skilled in the art, for example, a number of times a property (e.g. a frequency) of the communication channel of the network is changed, such that changing a property (e.g. a frequency) of the communication channel increments the first count value.

The first count value may directly represent the change in the property, for example, give a direct indication of the number of messages received by the first network device. In other embodiments, the first count value may only be dependent upon the change in the property, for example, give an indication (e.g. above or below an expected value) of the change or difference in the count over a predetermined time period.

As hereafter described with reference to FIG. 2, the first count value is embodied as a message count value indicative of the number of messages or the amount of data received by the first network device 100 from the network bridge 200.

The message count value may, for example, be directly indicative of how many messages are successfully received by the first network device 100 (i.e. each message received by the first network device is counted by the device processor). In other embodiments the message count value is indicative of how much data is received by the first network device 100 from the network bridge 200. For example, the first network device may count the number of bits successfully received from the network bridge.

In some embodiments, the message count value only corresponds to messages received over a specific predetermined period of time. This predetermined time period may be an absolute period of time (e.g. the previous five minutes or the previous ten minutes).

The message count value may, for example, be stored on the device memory 102, and incrementally increased by the device processor 101 in response to the first network device receiving a message from the network bridge.

The first network device 100 is adapted to pass the message count value to the network bridge 200. This may be done, for example, periodically (e.g. once every minute) or in response to a count request message transmitted by the network bridge.

The processor 210 of the network bridge is adapted to receive the message count value from the first network device 100 to thereby ascertain the message count value (i.e. the first count value) associated with the first network device 100.

The processor 210 is also adapted to ascertain a second count value associated with the network bridge. The second count value is associated with an equivalent or corresponding incremental as the first count value, but with relation to the network bridge. For example, the second count value is indicative of the number of messages or the amount of data transmitted to the first network device 100 by the network bridge 200.

The processor 210 of the network bridge may store the message count value (i.e. first count value) and the second count value on the bridge memory 220 of the network bridge.

The processor 210 is adapted to determine a state of the first network device based on the message count value and the second count value. In particular, if the message count value is within a predetermined range of values relative to the second count value, the first network device is determined to have been unreachable because it was inactive.

An inactive network device will be understood to be a network device which is unable to correctly receive or route messages. This may be because it has been switched off; temporarily reset; stuck in an operating state from which is cannot be removed externally and/or broken (e.g. a broken transceiver). Other examples of an inactive network device will be readily apparent to the person skilled in the art.

It is therefore apparent that, in a generalised description of the embodiment, there may be provided a first network device associated with a first count value (e.g. the message count) and a second network device (e.g. the network bridge) associated with a second count value. A processor according to an embodiment is adapted to ascertain the first and second count values, and determine a state of the first network device based on the first and second count values.

The first count value is reset in the event that the first network device becomes inactive (e.g. switches off or becomes stuck in an operating state from which it cannot be removed externally). In further optional embodiments, the network bridge 200 is adapted to send a reset message to the first network device 100 so as to reset the first count value (e.g. adjust the first count value to zero or another predetermined value).

It will therefore be apparent that the first count value is reset upon the first network device becoming inactive, but is not reset upon the first network device going out of range. This allows the processor according to an embodiment of the invention to explicitly determine the cause of a network device becoming unreachable (i.e. identify a cause of a fault).

Similarly, in embodiments, the second count value is reset upon the second network device (e.g. the network bridge) becoming inactive. This allows the network to ensure that if the entire network is switched off, each count value is reset so as to reduce the chance of false identification of inactive network devices.

In some embodiments, the first and second count values are reset periodically (e.g. following a periodic determining of a state of the first network device). This allows the processor to account for previous errors in the network and more accurately determine a time of a fault occurrence.

In some embodiments, when the first network device 100 is inactive, it may be unable to pass the first count value to the network bridge 200. In this scenario, the processor 210 of the network bridge may infer that the first count value is zero. In such embodiments, the processor 210 may assume that the first count is zero unless an appropriate message count value is received from the first network device 100.

The device input module 105 is adapted to control the power supply to the first network device, so as to allow the device to be switched on and off (i.e. powered on/off). A user may control the device input module so as to switch the first network device on and off, and may, for example, be a switch.

Figure 3:
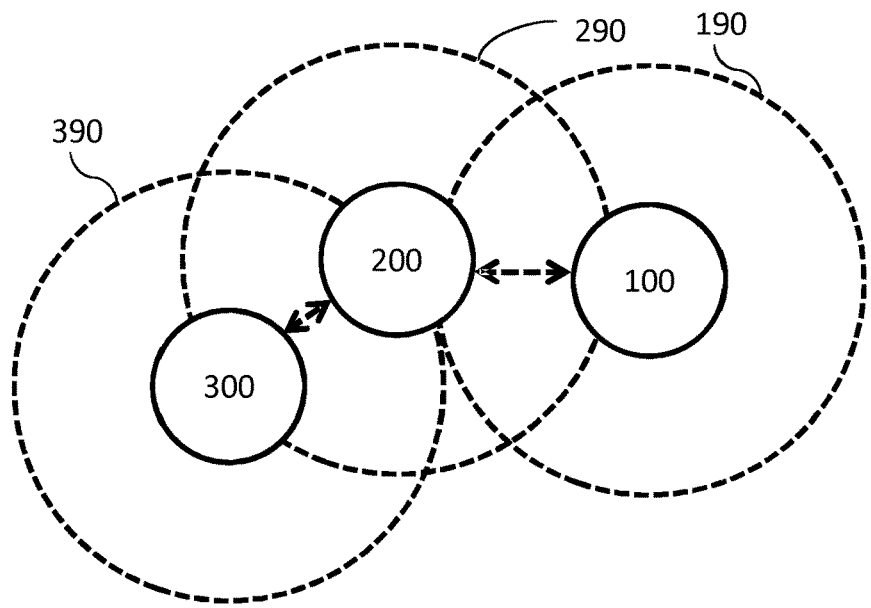
FIG. 3 conceptually depicts a first network device within range of the network comprising a network bridge having a processor according to a first embodiment of the invention.
Figure 4:
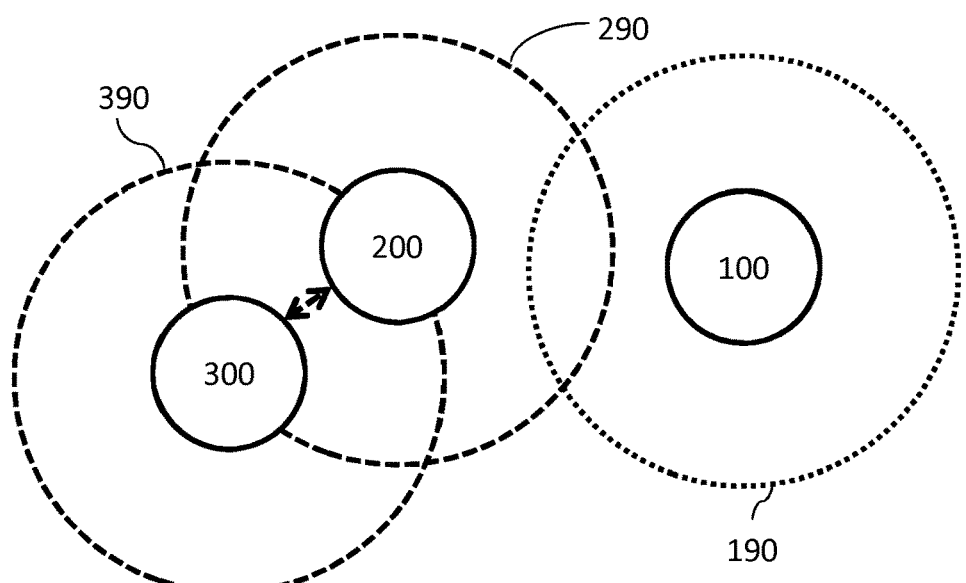
FIG. 4 conceptually depicts a first network device out of range of the network comprising a network bridge having a processor according to a first embodiment of the invention.

The concept of the first network device being in range or out of range of the network will be understood with reference to FIGS. 3 and 4. FIGS. 3 and 4 both identify the network bridge 200, the first network device 100 and the first additional network device 300.

There is conceptually identified a first communication range 290 of the network bridge, the first range being the extent to which a signal emitted by the network bridge may be received by an arbitrary network device. Similarly, there is identified a second range 190 of the first network device and a third range 390 of the first additional network device.

Each device (e.g. the network bridge or a network device) may only reliably transmit messages (i.e. with a high probability of successful receipt) to another device for the network when that other device is within its respective range. For example, the first network device 100 will only reliably receive a message from the network bridge 200 when the first network device is positioned in the first range 290 of the network bridge 200.

Messages may be routed through a plurality of devices, as each device may act as a router. Accordingly, the range of the network is considered to be the cumulative independent ranges of devices which are, at least indirectly, connected to the network bridge 200. In other words, the network comprises at least the network bridge. For example, in FIG. 3, as the first network device and the first additional network device are both within the first range 290 of the network bridge, the range of the network is the combination of the first range 290, the second range 190 and the third range 390. The range of the network is more clearly identified as the dashed lines of FIGS. 3 and 4.

With specific reference to FIG. 3, the first network device is able to receive messages from the network bridge and the first additional network device, as it is positioned within one of the first range 290 or the third range 390 (as the first additional network device is within the first range 290). Accordingly, the first network device is considered to be within range of the network.

With specific reference to FIG. 4, the first network device 100 has been moved such is unable to receive messages from the network bridge or the first additional network device, as it is not positioned within range of either these devices. In other words, the first network device 100 is no longer within range of the network.

Accordingly, when positioned as in FIG. 3, the first network device may receive messages from the network bridge, and is therefore able to increment the message count value. When positioned as in FIG. 4, the first network device may not receive messages from the network bridge, and is therefore unable to increment the message count value.

Thus, it will be apparent that an out of range network device is understood to be one which is capable of correctly receiving or routing messages, but is unable to do so because it is not able to connect to the network.

When the first network device is positioned right at the extremity of the network range, the first network device may be considered to be only sporadically within range of the network, such that it wavers between being with range of the network and being out of range of the network. This may also affect the incrementing message count value, so as to not increase as much as if the first network device were wholly within the range of the network.

Figure 5:
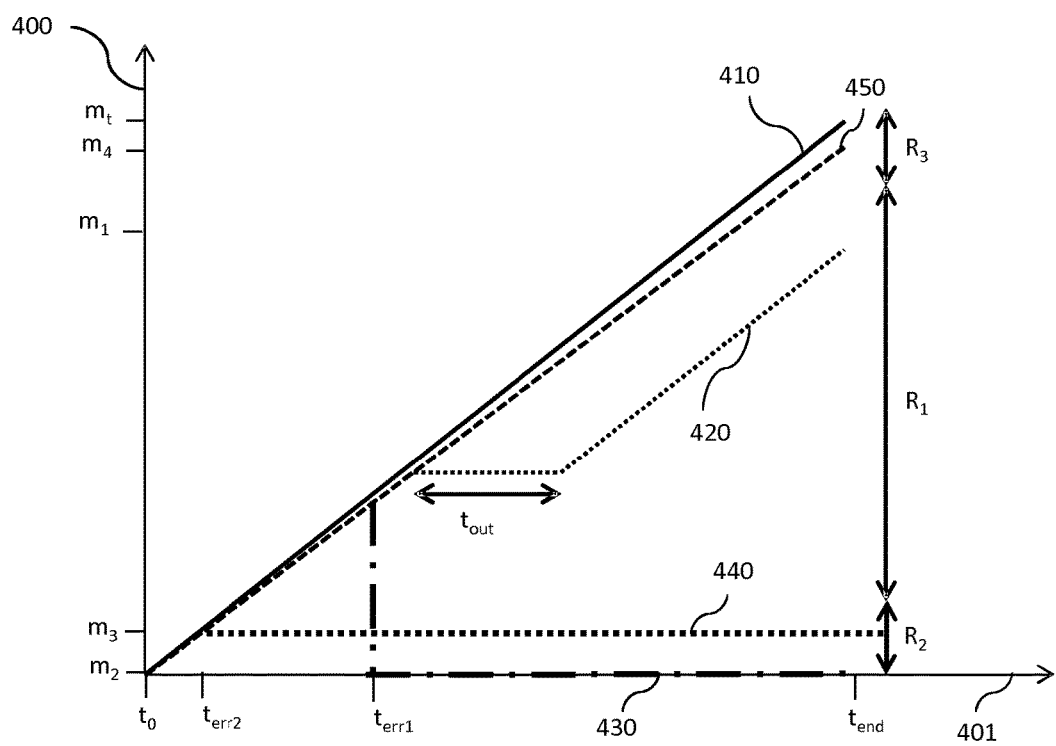
FIG. 5 is a chart depicting exemplary first count values, embodied as message count values, for a first network device.

Turning now to FIG. 5, an embodiment of an operation of determining the state of the first network device will be made apparent. FIG. 5 depicts a conceptual chart which identifies exemplary message count values generated by the first network device. A vertical axis 400 represents a number of messages, and a horizontal axis 401 represents the passage of time.

A first line 410 represents messages transmitted by the network bridge for provision to the first network device, which may be otherwise be understood to be the second count value. A second line 420 represents messages received by the first network device (i.e. the first count value) in a first scenario, wherein the first network device is temporarily moved out of range of the network for a time $t_{out}$.

For the purposes of explanation, at a time $t_0$, both the first count value (message count value) and the second count value (messages transmitted) are reset to zero.

During a time period (e.g. from $t_0$ to $t_{end}$) the number of messages transmitted by the network bridge 200 increases to a message transmitted value $m_t$. The message transmitted value may be understood to be an example of the second count value at a time $t_{end}$.

The number of messages received by the first network device 100, however, only increases to a lower first message count value $m_1$. This is due to the first network device being temporarily (for a time period $t_{out}$) out of range of the first network.

In other words, the message count value is not incremented during the time $t_{out}$ as the first network device is out of range of the network. When the first network device is brought back into range of the network, the message count value is incremented once again. As the first network device remains active (i.e. capable of receiving messages), however, the message count value is not reset during time $t_{out}$.

This first message count value $m_1$ is passed to the processor 210 of the network bridge 200 (e.g. at time $t_{end}$). The processor determines a state of the first network device to have been unreachable at least in the time period $t_0$-$t_{end}$ because it was out of range of the network. This is due to the fact that the first message count value $m_1$ is within a first predetermined range $R_1$.

Thus it is readily apparent that the first message count value $m_1$ is ascertained by the processor 210 at a time $t_{end}$ and the state of the first network device is determined based on this first message count value. As the first message count value is within the first predetermined range of values $R_1$, the first network device is correctly determined to have been unreachable because it is out of range of the network.

In other words, in an embodiment, the processor 210 is able to detect that the first network device has been out of range of the network based on the message count value.

A third line 430 represents messages received by the first network device (i.e. the first count value) in a second scenario, wherein at a time $t_{err1}$ the first network device is switched off, in a sleep mode or stuck in a state from which it cannot be removed externally or cannot be corrected by an external device (i.e. inactive). The number of messages transmitted by the network bridge is identical to that of the first scenario (i.e. $m_t$ remains the same). During the time period (in the second scenario), the number of messages received by the first network device 100 is a second message count value $m_2$.

The second message count value $m_2$ is very low, that is near-zero, due to the inactive state of the first network device.

For example, initially the first network device 100 correctly receives messages from the network bridge. At a time $t_{err1}$, the first network device enters an unrecoverable error state for the remainder of the time (i.e. until at least $t_{end}$), where it is no longer able to receive messages from the network bridge (i.e. has become inactive). In this scenario, the message count value is reset, and no longer able to be incremented, such that the third message count value is near-zero.

It will be readily apparent that the processor is able to determine, based on the second message count $m_2$, that the first network device has been inactive.

The second message count value $m_2$ is passed to the processor 210 of the network bridge 200. The processor is adapted to determine the state of the first network device based on the second message count value $m_2$. The processor determines that the second message count value is within a second predetermined range $R_2$, and thereby correctly determines that the first network device was unreachable because it was inactive Thus it will be apparent that the state of the first network device may be further determined with reference to a predetermined range so as to determine whether the first network device is unreachable because it is switched off or otherwise inactive.

A fourth line 440 represents messages received by the first network device in a third scenario, where the first network device becomes inactive at a time $t_{err2}$. For example, the device may enter a state where it is no longer able to receive or transmit messages or it is simply switched off, such that the message count value is no longer incremented.

Accordingly, the third message count $m_3$ (indicative of the first count value at the time $t_{end}$ during this third scenario) only resides within the second predetermined range. Hence the device is determined to have become inactive in at least the time period since a last reset of the first count value.

It will be apparent that if the time period $t_0$-$t_{end}$ is sufficiently large, the count value associated with an inactive device will not be able to enter the first predetermined range, whereas the count value associated with a temporarily out-of-range device (such as the first network device in the first scenario) will be able to enter the second predetermined range. Hence inactive devices may be readily distinguished from temporarily out-of-range devices. (as out-of-range devices will again increase their count value upon becoming in range once more). Accordingly, for the third scenario it can be readily determined that the first network device has become inactive.

It will be readily apparent that devices that are inactive for the entirety of the time period $t_0$-$t_{end}$ also have a message count (at time $t_{end}$) within the second predetermined range $R_2$.

In at least one embodiment, where the message count value is reset when the first network device is reset, the message count value may be unable to reach the second predetermined range of values within the time period $t_0$-$t_{end}$. The network bridge may thereby be able to detect that the first network device was inactive or switched off during at least one point of the time period.

A fifth line 450 represents messages received by the first network device (i.e. the first count value) in a fourth scenario, wherein the first network device is active and correctly operational. The number of messages transmitted by the network bridge is identical to that of the first scenario. Following the time period of the fourth scenario, the number of messages received by the first network device 100 is a fourth message count value $m_4$.

The fourth message count value $m_4$ is very high, that is near or substantially equal to the message transmitted value $m_t$. It is apparent that although the first network device is currently active and within range of the network, not all messages may be received by the first network device (e.g. for reasons of noise).

When the fourth message count value $m_4$ is passed to the processor 210 of the network bridge, the processor determines that the fourth message count value is within the third determined range $R_3$, and thereby determines that the first network device was reachable at least in the time period $t_0$-$t_{end}$.

Thus it will be apparent that in at least one embodiment, the state of the first network device may be further determined with reference to a third predetermined range so as to determine whether the first network device is reachable.

It will be apparent that the first message count value $m_1$, the second message count value $m_2$, the third message count value $m_3$ and the fourth message count value merely represent the final message count value after a period of time ($t_0$-$t_{end}$) in different scenarios or iterations. In other words, they represent different examples of the first count value at time $t_{end}$.

In some embodiments, messages are only periodically transmitted by the network bridge for provision to the first network device and the message count value is passed to the processor 210 at periodic intervals. In such an embodiment, the first, second and/or third predetermined range may be absolute (e.g. constant), as a known number of messages will always be transmitted by the network bridge.

In embodiments the network bridge 200 may store the message transmitted value (i.e. the second count value at a time $t_{end}$), being indicative of the number of messages broadcast for provision to the first network device, on the bridge memory 220 for example. The processor 210 may use this message transmitted value to dynamically determine at least the first predetermined range of values upon receiving the message count value.

Thus, the predetermined range may be a percentage of the messages broadcast by the network bridge for provision to the first network device in a predetermined time period.

For example, the first predetermined range may be between 10% and 90% of the messages transmitted by the network bridge for provision to the first network device. In other words, if the message count value $m_c$ is between one tenth of the message transmitted value (i.e. $0.1 \times m_t$) and nine tenths of the message transmitted value (i.e. $0.9 \times m_t$), the first network device is determined to be unreachable because it is out of range of the network.

In other embodiments, the first predetermined range is between 15% and 85% of the message transmitted value, or between 20% and 80% of the message transmitted value. Other possible ranges with reference to the message transmitted value will be readily apparent, for example: between 30% and 80%, between 20% and 90%; between 5% and 95% and so on.

The second predetermined range may, for example, be between 0% and 10% of the message transmitted value $m_t$. Other possible ranges for the second predetermined range (with reference to the message transmitted value) will, of course, be readily apparent, for example: between 0% and 5%, between 0% and 15%, between 0% and 20%. Preferably, a lower boundary of the second predetermined range is 0%, as this will more accurately identify devices that are unresponsive (i.e. inactive). The upper boundary may be determined based on characteristics of the network device, for example, a device in a 'sleep state' may still be able to receive a limited number of messages, but may still be considered inactive.

The third predetermined range may, for example, be between 90% and 100% of the message transmitted value $m_t$. Other possible ranges for the third predetermined range (with reference to the message transmitted value) will, of course, be readily apparent, for example: between 80% and 100%, between 85% and 100%, between 95% and 100%.

An upper boundary of the third predetermined range is preferably 100%, as this will account for devices that are fully successful in receiving messages. A lower boundary of the third predetermined range may depend, for example, on a noise of the channel, as a device may be correctly operational but merely in a temporarily noisy channel. A lower boundary may, in embodiments, further account for slight errors in counting the number of messages received and negligible errors in receiving messages.

The predetermined time period may be a length of time since a last reset message was sent to the device or an absolute period of time (for example, the previous five minutes). In some embodiments, the predetermined time period is a length of time since a last reset of the first network device (e.g. since the first network device was last switched on) or since a last reset of the network bridge.

Embodiments according to the invention therefore allow a state of the first network device to be readily determined with reference to a message count value (i.e. a first count value) and a message transmitted value (i.e. a second count value). In particular, the processor may advantageously detect the cause of a failure of the first network device with a high probability of accuracy, for example, whether the first network device has been out of range of the network or whether a device has been inactive.

The further embodiments comprising detecting whether the first network device is out of range of the network advantageously allow for additional capabilities in detecting the cause of a failure of a first network device.

The message count value may be indicative of the total number of messages that the first network device receives (e.g. including messages routed through the first network device), or may simply be indicative of the number of first network device specific messages received (i.e. a count of only the messages or amount of data intended for the first network device).

Figure 6:
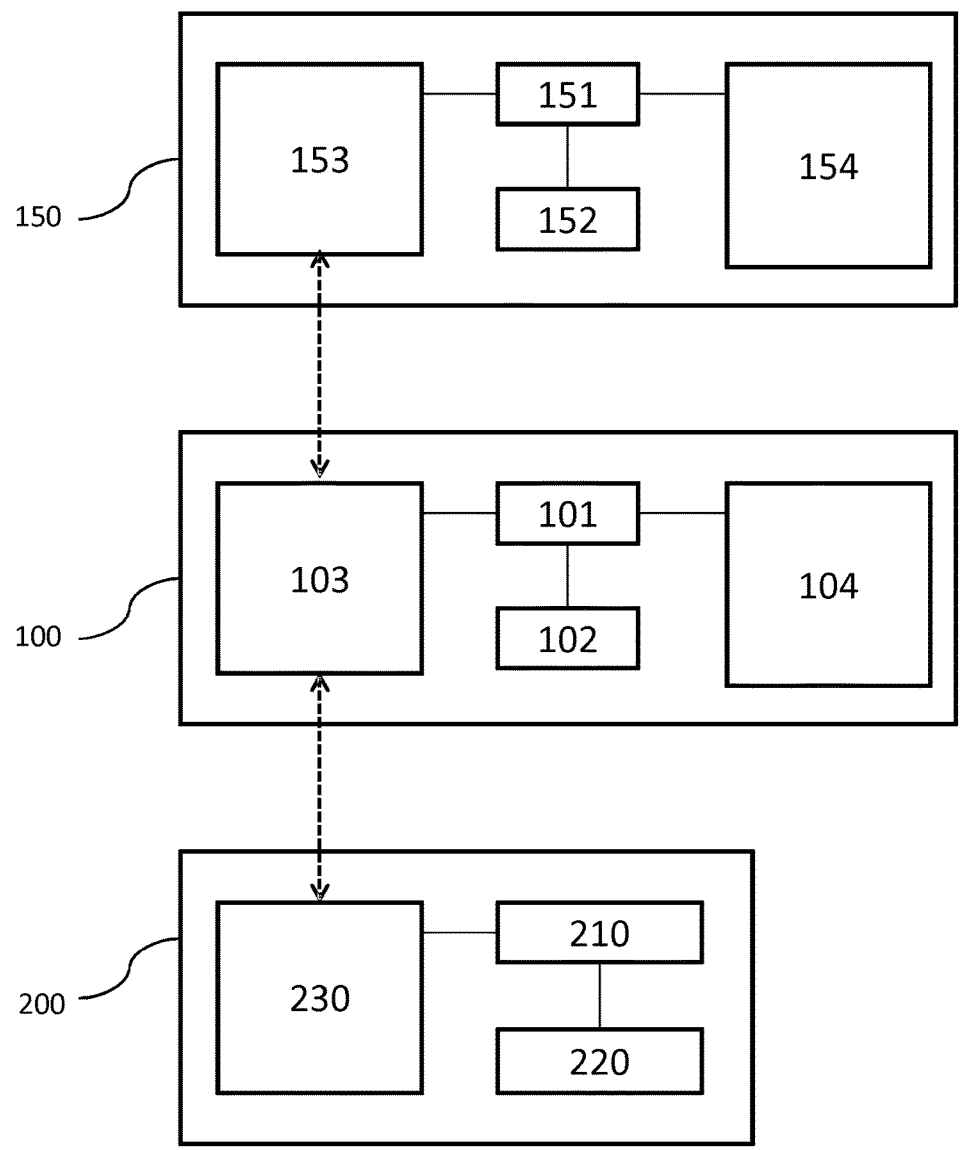
FIG. 6 illustrates a first network device, a second network device and a network bridge comprising a processor according to a second embodiment of the invention.

A processor according to a second embodiment of the invention will be understood with reference to FIG. 6, which identifies a network bridge 200 having the processor according to the second embodiment, the first network device 100 and the second network device 150.

The first network device 100 is again embodied as a wirelessly connectible lamp, having a light emitting element 104, a device processor 101, a device memory 102, a device input module 105 and a device transceiver 103.

The network bridge 200 comprises a processor 210 as in the first embodiment of the invention, a bridge memory 220 and a bridge transceiver 230.

The second network device is also embodied similarly to the first network device; that is the second network device comprises a respective device transceiver 153, device processor 151, device memory 152 and a light emitting element 154. The second network device is adapted to pass or route messages to the first network device.

The first and second network devices are both adapted to generate a respective count value indicative of the time that has passed since a last reset of the respective time value (i.e. a time since a last reset). That is to say, the count value measures the time elapsed since the count value was last reset.

In other words, the first network device is associated with a first count value representative of a time elapsed since a last reset of the first count value. The second network device is associated with a second count value representative of a time elapsed since a last reset of the second count value.

The first count value is reset upon the first network device becoming inactive, but is not reset upon the device going out of range of the network. Similarly, the second count value is reset upon the second network device becoming inactive, but is not reset upon going out of range of the network.

A count value may be determined by a counter operating on a particular clock. In other embodiments, an absolute time (i.e. with reference to a time of the day) may be stored upon resetting the count value; the count value being determined with reference to this stored absolute time and a present absolute time.

Whenever a message is transmitted (e.g. routed) by the second network device to the first network device, a sample of the second count value on transmission of the message is added to the message. Such a time value may be understood to represent a relative timestamp for the message.

Whenever a message is received by the first network device, a sample of the first count value upon receipt of the message is stored together with the sample of the second count value included in the message (i.e. the sender's time stamp).

In other words, when a message is sent from the second network device to the first network device, the second count value (at the time of transmission) is passed to the first network device, which also stores the first count value (at the time of receiving).

The first network device is adapted to store the respective sampled count values for at least two consecutive transmitted/received messages. Thus, there is stored on the second network device at least a first time value $t_1$ (time value of transmission of a first message), a second time value $t_2$ (time value of receipt of the first message), a third time value $t_3$ (time value of transmission of a second message) and a fourth time value $t_4$ (time value of receipt of the second message).

The first and third time values may be considered to be different samples of the second count value. The second and fourth time values may be considered to be different samples of the first count value. Each of the first, second, third and fourth time values may be stored on the bridge memory of the network bridge.

A difference value $s_{diff}$ may be calculated based on the stored time values. This may be done, for example, through using the following equations:

$$\Delta t_t = t_3 - t_1 \quad (1)$$

$$\Delta t_r = t_4 - t_2 \quad (2)$$

$$s_{diff} = \Delta t_t - \Delta t_r = (t_3 - t_1) - (t_4 - t_2) = (t_3 - t_4) - (t_1 - t_2) \quad (3)$$

$\Delta t_t$ is the difference between the second count value upon transmission of the second message and the second count value upon transmission of the first message. $\Delta t_r$ is the difference between the first count value upon receipt of the second message and the first count value upon receipt of the first message.

The first and second network device may be associated with a receiver difference value $\Delta t_r$ and transmission difference value At respectively. The receiver difference value is a difference between a time since a last reset of the first network device upon receiving the second message and a time since a last reset of the first network device upon receiving the first message. The transmission difference value is a difference between a time since a last reset of the second network device upon transmitting a first message and a time since a last reset of the second network device upon transmitting a second message.

The difference value is determined to be a difference between the transmission difference value $\Delta t_t$ and the receiver difference value $\Delta t_r$.

In other words, as will also be identifiable in Equation 3, the difference value is also associated with a first calculated difference $(t_1-t_2)$ and a second calculated difference $(t_3-t_4)$. The first calculated difference is the difference between a time since reset for the transmitter upon transmitting the first message and a time since reset for the receiver upon receiving the first message. The second calculated difference is the difference between a time since reset for the transmitter upon transmitting the second message and a time since reset for the receiver upon receiving the second message.

The difference value may thereby be otherwise determined to be the difference between the second calculated difference and the first calculated difference.

Based on the difference value a state of the first network device and optionally a state of the second network device may be determined.

For example, if the difference value is zero both devices are determined to be operating correctly and have not been reset. This is because no device has been reset in-between messages, and the time difference between two transmissions (relative to the transmitter) and the time difference between two receipts (relative to the receiver) of messages is the same.

If the difference value is greater than zero, the first network device is determined to have been reset between the messages. This is because the difference between the time since reset (relative to the receiver) upon receiving the second message and the time since reset (relative to the receiver) upon receiving the first message is less than the difference between the time since reset (relative to the transmitter) upon transmitting the second message and the time since reset (relative to the transmitter) upon transmitting the first message.

It is clear when the first network device has been reset the difference between the fourth time value and the second time value will be less than the difference between the third time value and the first time value, as the first count value for the first network device will have been reset between a time of receiving the first message and the second message.

If the difference value is less than zero, the second network device is determined to have been reset between the messages. This is because the difference between the time since reset (relative to the transmitter) upon transmitting the second message and the time since reset (relative to the transmitter) upon transmitting the first message is less than the difference between the time since reset (relative to the receiver) upon receiving the second message and the time since reset (relative to the receiver) upon receiving the first message.

Furthermore, if the difference value is greater than zero, the first network device is determined to be a cause of network performance degradation. Moreover, if the difference value is less than zero, the first network device is determined to be at least partially unable to correctly communicate with the second network device.

Determining the state of the first and optionally second network device in this manner advantageously allows a reset of the first/second network device to be readily recognised.

In a simplified embodiment, the difference value may be simply only one of the first calculated difference or the second calculated difference. In other words, the difference value may be a difference in time since reset of the second network device upon transmitting a first message to the first network device, and a time since reset of the first network device upon receiving the first message (e.g. $t_1 - t_2$).

This simplified embodiment advantageously requires the use of less memory and thereby consumes less power in usage. However, it is less accurate in determining the time of a reset of the first and/or second network devices.

It will be apparent that, in at least one embodiment, the network bridge may act as the second network device, the network bridge being adapted to pass messages to and from the first network device.

The determination of the state of the first and optionally second network device is performed by a processor according to an embodiment of the invention. Such a processor may be positioned, for example, within the first network device 100 or the network bridge 200. When positioned in the network bridge, the network bridge may be adapted to receive the difference value from the first network device or individually receive the first, second and optionally third and fourth time values from the first and second network device so as to calculate the difference value.

In at least one embodiment, there is a margin of error for determining the state of the device relative to zero, so that zero does not have to be used as an absolute value for comparison. The state of the device may be determined to be correctly operational when the difference value is approximately zero (e.g. $-x \leq$ difference value $\leq x$) where x is a suitable value to give an appropriate range. This advantageously ensures reliability of the network, as the probability of false determination of the state of the first and optionally second network devices will be reduced. By way of example, when the difference value is substantially close to zero (e.g. less than 1), the first and second network devices are determined to be correctly operational.

In at least one further embodiment, the network bridge 200 is adapted to transmit a second reset signal to the first 100 and second 150 network device so as to reset the counts values, either to zero or to another known value in the network. This advantageously allows the devices to have a synchronised count value, and thereby reduces the probability of a false determination of the state of the first and optionally second network devices.

In some further embodiments, the second reset signal may be broadcast by the network bridge 200 when the first 100 and second 150 network devices are first enabled, so as to ensure correct synchronization of the network devices.

The network bridge 200 may optionally be adapted to send the second reset signal in response to a user input. This mechanism advantageously allows a user to 'clear' known errors (for example, when these are caused by a known and/or controlled action) for which consequence need not be further propagated.

Optionally, each device may reset his own count value, if it is able to determine that is has been offline or in sleep-mode. This allows devices to actively take their role in the network.

In some embodiments, the count value is reset subsequent to sending and/or receiving a message.

The processor 210 may be adapted to generate information for a user based on the determined state of the first and optionally second network device. This information may be passed to a visual output device adapted to display a visual representation of the information. In some embodiments, the information is additionally or otherwise passed to an audio output device adapted to be capable of outputting an audio indication (e.g. using speech synthesis) of the state of the first network device. In other or further embodiments, the information is also/additionally passed to a mechanical feedback device (e.g. a mechanical vibrator) adapted to output a mechanical alert as to the state of the first network device. The visual output device and/or audio output device and/or the mechanical feedback device may, for example, be positioned in the network bridge or another external device (e.g. a network device connected to the network).

A processor according to an embodiment of the invention may be adapted to ascertain both the message count value and the difference value associated with the first network device. The state of the first network device may be determined based on both the message count value and the difference value. In one exemplary scenario, the first network device may be determined to be out of range of the network (if the message count value is within the first predetermined range) but has not been reset in between messages (if the difference value is zero).

The processor 210 may be further adapted to count a reset value indicative of the number of resets of the first network device 100. For example, the processor may count the number of times the first device is determined have been reset in between the messages, that is cumulatively count the number of times the difference value is greater than zero. In other embodiments, the first network device may be adapted to provide an indication to the processor in response to being powered on (e.g. reset). The number of indications sent by the first network device may be counted by the processor so as to calculate a number of times the first network device has been reset and thereby ascertain a reset value. In some embodiments, the processor may count the number of times that the message count value is determined to be within the second predetermined range of values.

In further such embodiments, the processor may be adapted to determine a state of the first network device based on the reset value of the first network device. For example, if a reset value of the first network device in a predetermined time period (e.g. an hour) is very high (e.g. indicative of more than at least 20 resets, for example more than 40 resets), the processor may determine that the first network device is malfunctioning. Alternatively or additionally, the processor may determine that a user of the first network device desires to have the first network device periodically turned on and off.

Determining the state of the first network device based on the reset value will advantageously increase the reliability of the state determination as well as provide further information about the state of the first network device.

Figure 7:
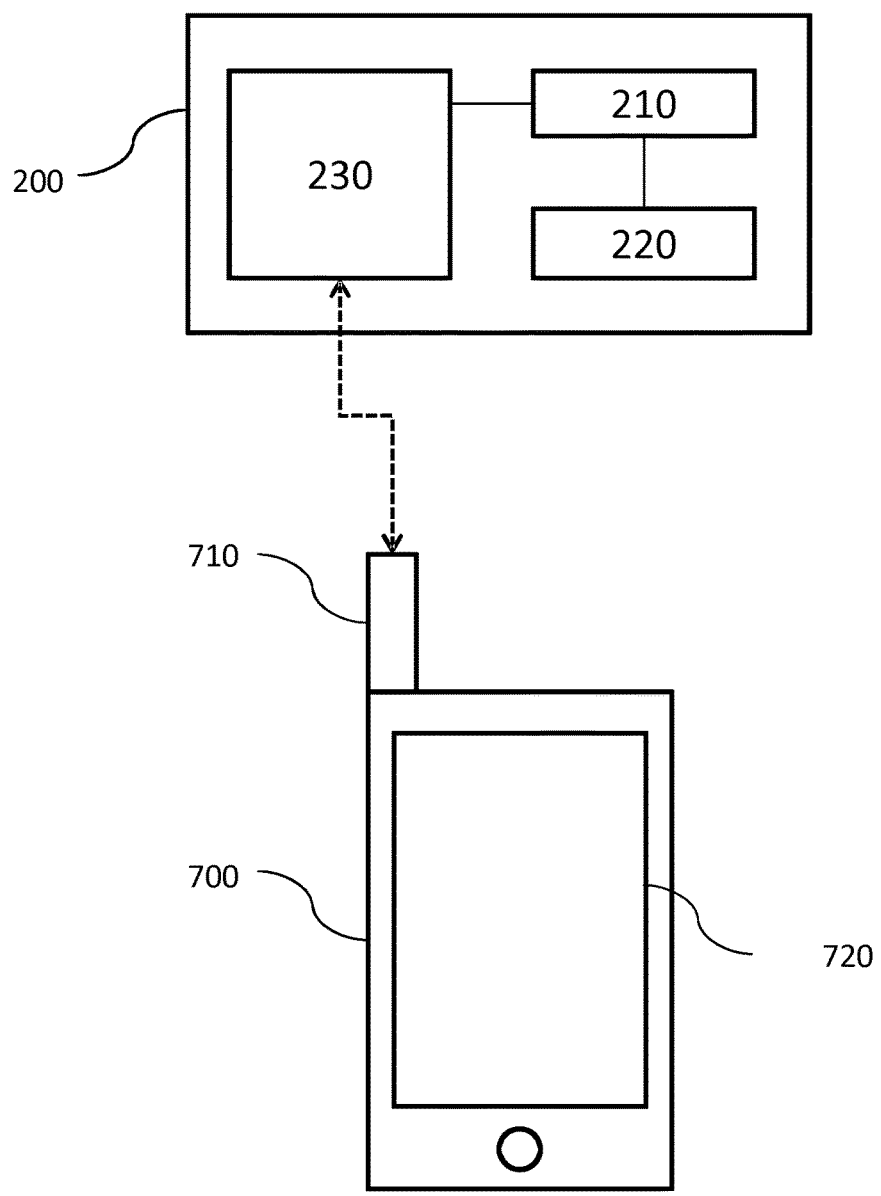
FIG. 7 illustrates a network bridge comprising a processor according to an embodiment of the invention and a mobile device.

With reference now to FIG. 7, a further embodiment of the network bridge comprising a processor 210 according to an embodiment of the invention is described.

The network bridge 200 is further adapted to communicate with a mobile device 700. The mobile device 700 comprises a mobile antenna 710 and a visual output display 720. The visual output display may, for example, comprise a touch screen display or an array of LEDs.

The mobile device 700 is adapted to pass instructions to the network bridge 200 (e.g. via the network) so as to cause the network bridge to generate messages for at least one connected network device. The mobile device is thereby adapted to control the said at least one connected network device.

The mobile device is also adapted to receive, from the processor 210, information for the user based on the determined state of the first network device.

The mobile device 700 is adapted to display on the visual output display 720 to a user a visual representation of the information for the user and optionally a state of the first network device.

For example, if a state of the first network device is determined to be unreachable because it is inactive (i.e. switched off), the visual output display provides an indication of this to the user.

In one embodiment, the mobile network device is a computing device (e.g. smartphone, tablet or smart watch) adapted to execute instructions so as to run an application for controlling the network 1. The mobile network device may comprise a user-interactive display (e.g. a touch screen display) such that the application can be displayed to the user and allow the user to interact with the said application.

In a first scenario of such an embodiment a user may open the application (with the intention of controlling an arbitrary network device) and see a notification (e.g. an exclamation mark) indicating that the first network device is disabled. As the user clicks the notification, the mobile network device may inform the user that it is likely that the first network device has been turned off, thereby disabling the first network device.

In another scenario, a user may move the first network device 100 out of range of the network 1. As the first network device is moved out of range, the application shows a notification to indicate there is a conflict. The user may, for example, be instructed to switch on another network device (e.g. within range of the network and closer to the first network device) so as to extend the range of his network. Upon following the instruction, the first network device may connect to this closer device, and thereby re-establish connection to the network.

In some embodiments, the mobile device may comprise an audio output device in addition to or instead of the visual output display 720. The mobile device may be adapted to output an audio indication (e.g. using speech synthesis) of the state of the first network device.

In other or further embodiments, the mobile device comprises a mechanical feedback device (e.g. a mechanical vibrator) adapted to output a mechanical alert as to the state of the first network device. For example, if a first network device is taken out of range of the network, the mobile device may vibrate once whereas if a first network device is made inactive, the mobile device may vibrate twice.

In other or further embodiments, the processor may be adapted to automatically perform certain actions based upon the determined state of the first network device. For example, if it is determined that the first network device is unreachable because it is inactive (e.g. switched off) the processor may determine to not use that the first network device in attempting to route signals to a second network device capable of connecting to the first network device.

Although the above embodiments have typically described the processor as being an aspect of a network bridge, it will be readily apparent that in other embodiments, the processor may be internalised on the first network device such that the first network device may automatically detect when it has gone out of range.

For example, a first network device having such a processor may know that it is supposed to receive 100 messages in a specific time period (e.g. as messages are received only periodically). A first predetermined range of values indicting that the device may have been out of range may be one of the following: around 10-90 messages, around 15-85 messages; around 20-80 messages and so on. Upon receiving only 60 messages, for example, the processor may determine that the first network device has been taken out of range and may thereby notify a user. The first network device may comprise a visual output device and display a representation of said information to the user on the visual output device. In other embodiments, an indication of the state of the first network device is provided through an audio output device (e.g. a speaker) or a mechanical feedback device (e.g. a mechanical vibrator).

In at least one embodiment according to the invention, the processor 210 is adapted to determine the state of a plurality of devices (e.g. first additional network device, second additional network device and so on) in the manner described above. In such an embodiment, the processor may thereby account for the respective states of a plurality of network devices in considering how to control an arbitrary network device.

By way of example, consider a network comprising a first, second and third network device positioned in a single room and a network bridge comprising a processor according to an embodiment of the invention. Each network device comprises a respective light emitting element. A user may desire a particular average luminance in that room (e.g. around 500 lux), which might typically require, for example, each of the first, second and third network devices to output light (from their light emitting element) at a particular percentage (e.g. 60%) of their maximum intensity. There may a scenario wherein the network bridge determines that the first and second network devices are correctly operational (i.e. reachable), but the third network device has been taken out of range of the network or has been reset/inactive. Accordingly, the network bridge may automatically cause the first and second network device to output light at a higher percentage of their maximum intensity (e.g. 90%) to maintain the desired average luminance in the room.

The processor may be adapted to determine the state of the first network device dependent on other information, this may include, for example, at least one of the following: a location of the first network device; a signal strength of the first network device in the network; the number of network devices in the network; an age of the first network device; a frequency of use of the first network device; a channel property of the network (e.g. frequency or channel encoding with which the device communicate); a number of network devices between the first network device and the network bridge and a distance of the first network device from the network bridge. Each of these examples of additional information may, for example, allow the state of the first network device to be determined with a greater degree of accuracy and/or probability of success.

Figure 8:
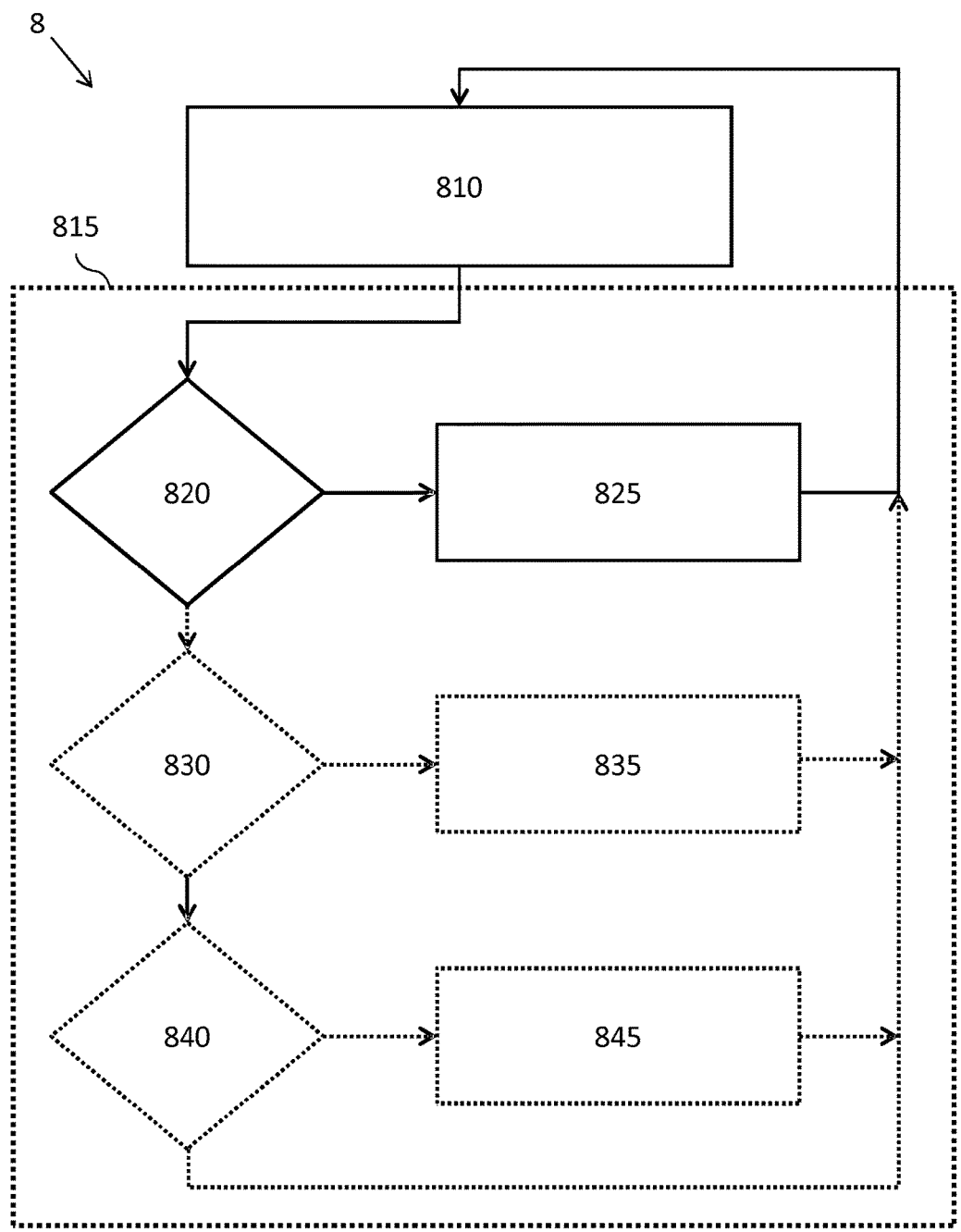
FIG. 8 illustrates a flowchart of a method of determining a state of the first network device according to an embodiment of the invention.

With reference to FIG. 8, a first method 8 of determining a state of a first network device in a network will be described.

The method 8 comprises ascertaining 810 a message count value associated with the first network device; and determining 815 a state of the first network device based on the message count value, wherein: if the message count value is determined in step 820 to be within a first predetermined range, the first network device is determined in step 825 to have been unreachable because it was out of range of the network.

Optionally, if the first count value is determined in step 830 to be within a second predetermined range, the first network device is determined in step 835 to be unreachable because it is inactive.

In further embodiments, if the first count value is determined in step 840 to be within a third predetermined range, the first network device is determined in step 845 to be reachable.

Figure 9:
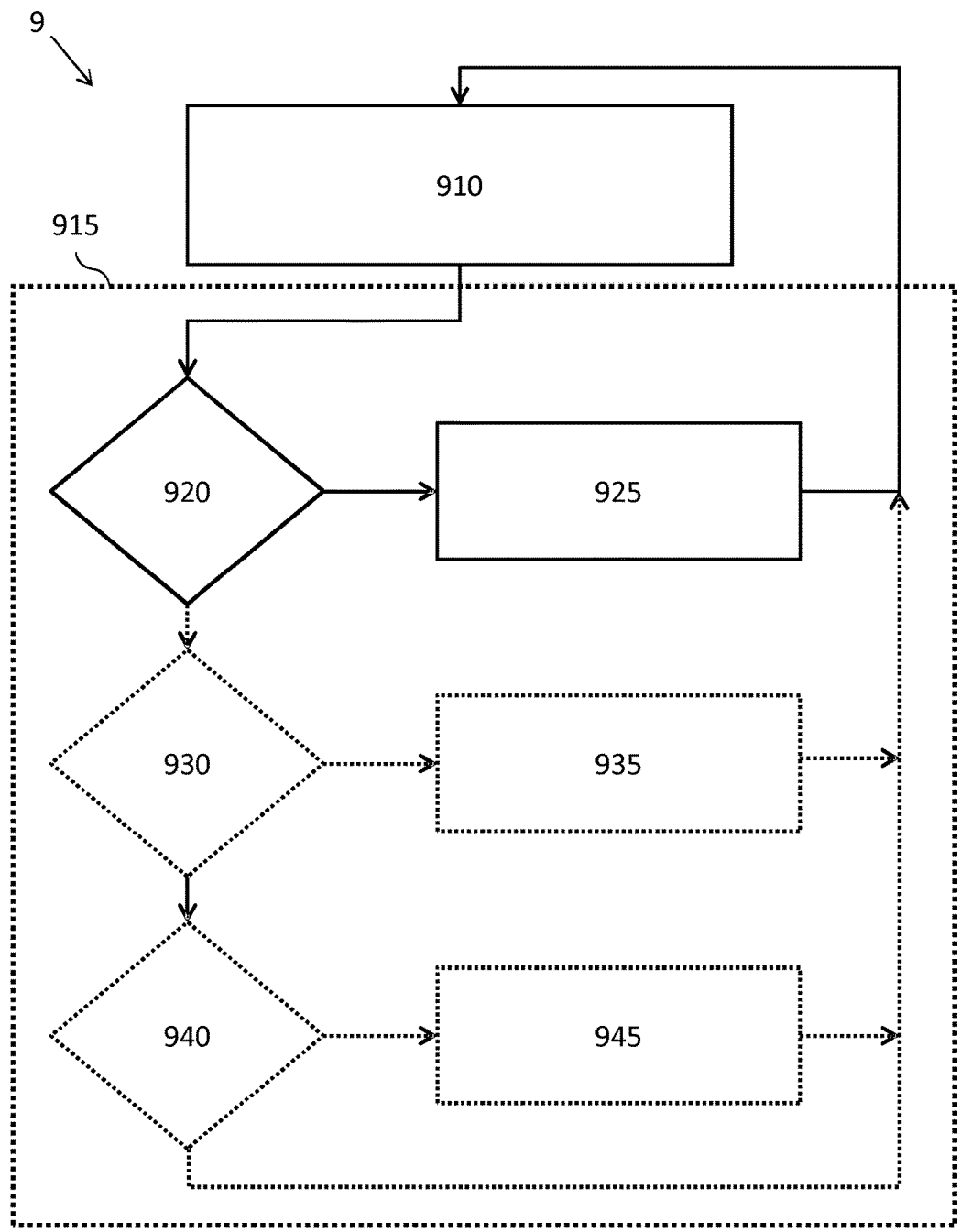
FIG. 9 illustrates a flowchart of a method of determining a state of the first network device according to another embodiment of the invention.

With reference to FIG. 9, a second method 9 of determining a state of a first network device in a network will be described.

The method 9 comprises ascertaining 910 a difference value associated with a difference between a first count value of the first network device and a second count value of a second network device of the network; and determining 915 the state of the first network device further based on the difference value.

The first count value may be associated with at least one message received by the first network device from the second network device (e.g. a count of the number of messages received or a difference in 'time since reset' between receiving two messages). The second count value may be associated with at least one message transmitted by the second network device for the first network device (e.g. a count of the number of messages transmitted or a difference in 'time since reset' between transmitting two messages).

In some other embodiments, the difference value is a measure of a difference between the number of messages transmitted by the first network device to a second network device and the number of messages received by the second network device. In other words, the first count value may be a number of messages transmitted by the first network device to a second network device and the second count value may be a number of messages received by the second network device.

In some embodiments, the first count value may be a difference between a time since a last reset of the first network device upon receiving a first message and a time since a last reset of the first network device upon receiving a second message, wherein the first network device receivers the first and second message from the second network device. The second count value may be a difference between a time since a last reset of the second network device upon transmitting a first message and a time since a last reset of the second network device upon transmitting a second message, wherein the second network device passes the first and second message to the first network device.

Typically, if the difference value is determined in step 920 to be greater than zero, the first network device is determined in step 925 to be a cause of network performance degradation; if the difference value is determined in step 930 to be less than zero, the first network device is determined in step 935 to be at least partially unable to communicate with the second network device; and if the difference value is determined in step 940 to be zero, the first network device is determined in step 945 to be operating correctly.

In a conceivable embodiment, there is provided a method which comprises ascertaining both the message count value and the difference value, and determining the state of the first network device based on the message count value and the difference value. For example, the state of the first network device may be determined to be active (if the message count value is in the third predetermined range) but unable to communicate with the second network device (if the difference value is less than zero).

In at least one embodiment, there is provided a computer program product comprising computer program code means adapted to perform all of the steps of the method as described with reference to FIG. 8 when said program is run on a computing device having a processor.

In at least one embodiment, there is provided a computer program product comprising computer program code means adapted to perform all of the steps of the method as described with reference to FIG. 9 when said program is run on a computing device having a processor.

The processor can be implemented in numerous ways, with software and/or hardware, to perform the various functions required. A processor for example employs one or more microprocessors that may be programmed using software (e.g., microcode) to perform the required functions. A controller may however be used which is implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A processor for determining a state of a first network device in a lighting network, the processor being adapted to:

ascertain a first count value associated with the first network device and a second count value associated with a second network device adapted to pass messages to the first network device;

determine the state of the first network device based on the first count value and the second count value, wherein if the first count value is within a first predetermined range relative to the second count value, the processor determines that the first network device has been inactive, wherein the first count value is dependent on a change of an incremental property of the first network device since a last reset of the first count value and the second count value is dependent on a change of an incremental property of the second network device since a last reset of the second count value.

2. The processor of claim 1, wherein:

the first count value is representative of a number of messages or amount of data received by the first network device from the second network device since the last reset of the first count value; and the second count value is representative of a number of messages or amount of data transmitted by the second network device for the first network device since the last reset of the second count value.

3. The processor of claim 2, wherein:

if the first count value is within a second predetermined range relative to the second count value, the first network device is determined to be unreachable because it is out of range of the network; and if the first count value is within a third predetermined range, the first network device is determined to be reachable.

4. The processor of claim 1, wherein:

the first count value is representative of a time elapsed since the last reset of the first count value; and the second count value is representative of a time elapsed since the last reset of the second count value.

5. The processor of claim 4 further adapted to:

ascertain a difference value based on a first calculated difference between the second count value measured in response to the second network device transmitting a first message to the first network device and the first count value measured in response to the first network device receiving the first message; and determine the state of the first network device based on the difference value.

6. The processor of claim 5 further adapted to ascertain a second calculated difference between the second count value measured in response to the second network device transmitting a second, later message to the first network device and the first count value measured in response to the first network device receiving the second message, wherein the difference value is a difference between the second calculated difference and the first calculated difference.

7. The processor of claim 5, wherein:

if the difference value is greater than a first predetermined value, the first network device is determined to be a cause of network performance degradation;

if the difference value is less than a second predetermined value, the first network device is determined to be at least partially unable to communicate with the second network device; and if the difference value is less than or equal to the first predetermined value and greater than or equal to the second predetermined value, the first network device is determined to be operating correctly.

8. The processor of claim 7, wherein both the first predetermined value and the second predetermined value is zero.

9. A first network device adapted to determine its own state, the first network device comprising a processor according to claim 1.

10. A network bridge comprising a processor according to claim 1, wherein the network bridge:

plays the role of the second network device adapted to pass messages to the first network device; and is adapted to receive the at least the first count value from the first network device.

11. A computer implemented method of determining a state of a first network device in a lighting network, the computer-implemented method comprising:

ascertaining a first count value associated with the first network device and a second count value associated with a second network device adapted to pass messages to the first network device;

determining the state of the first network device based on the first count value and the second count value, wherein if the first count value is within a first predetermined range relative to the second count value, the processor determines that the first network device has been inactive, wherein the first count value is dependent on a change of an incremental property of the first network device since a last reset of the first count value and the second count value is dependent on a change of an incremental property of the second network device since a last reset of the second count value.

12. The computer implemented method of claim 11, wherein:

the first count value is representative of a number of messages or amount of data received by the first network device from the second network device since the last reset of the first count value;

the second count value is representative of a number of messages or amount of data transmitted by the second network device for the first network device since the last reset of the second count value;

if the first count value is within a second predetermined range relative to the second count value, the first network device is determined to be unreachable because it is out of range of the network; and if the first count value is within a third predetermined range, the first network device is determined to be reachable.

13. The computer-implemented method of claim 11, wherein:

the first count value is representative of a time elapsed since the last reset of the first count value; and the second count value is representative of a time elapsed since the last reset of the second count value.

14. The computer-implemented method of claim 13, further comprising:

ascertaining a first calculated difference between the second count value measured in response to the second network device transmitting a first message to the first network device and the first count value measured in response to the first network device receiving the first message;

ascertaining a second calculated difference between the second count value measured in response to the second network device transmitting a second, later message to the first network device and the first count value measured in response to the first network device receiving the second message;

calculating a difference value, the difference value being a difference between the second calculated difference and the first calculated difference; and determining the state of the first network device based on the difference value.

15. The computer-implemented method of claim 14, wherein:

if the difference value is greater than a first predetermined value, the first network device is determined to be a cause of network performance degradation;

if the difference value is less than a second predetermined value, the first network device is determined to be at least partially unable to communicate with the second network device; and if the difference value is less than or equal to the first predetermined value and greater than or equal to the second predetermined value, the first network device is determined to be operating correctly.

* * * * *